US010712730B2

(12) United States Patent
Borowicz (10) Patent No.: US 10,712,730 B2
(45) Date of Patent: Jul. 14, 2020

(54) METHODS OF SYNCHRONIZING MANUFACTURING OF A SHIMLESS ASSEMBLY

(71) Applicant: The Boeing Company, Chicago, IL (US)

(72) Inventor: Clifford D. Borowicz, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/152,243

(22) Filed: Oct. 4, 2018

(65) Prior Publication Data

US 2020/0110389 A1  Apr. 9, 2020

(51) Int. Cl.
*G05B 19/418* (2006.01)
*B64F 5/00* (2017.01)

(52) U.S. Cl.
CPC . *G05B 19/41805* (2013.01); *G05B 19/41875* (2013.01); *B64F 5/00* (2013.01); *G05B 2219/45055* (2013.01)

(58) Field of Classification Search
CPC ........ G05B 19/401; G05B 2219/32194; G05B 19/41805; G05B 2219/37345;
(Continued)

(56) References Cited

U.S. PATENT DOCUMENTS 4,071,744 A * 1/1978 Pollock ................ G05B 13/026
235/411
4,488,137 A 12/1984 Rooney et al.
(Continued)

FOREIGN PATENT DOCUMENTS

DE   697 33 941    6/2006
EP    0 147 066    4/1987
(Continued)

OTHER PUBLICATIONS

English-language abstract of European Patent No. EP 0 976 472 downloaded from Espacenet.com on Apr. 29, 2014.
(Continued)

*Primary Examiner* — Darrin D Dunn
(74) *Attorney, Agent, or Firm* — Dascenzo Intellectual Property Law, P.C.

(57) ABSTRACT

Methods aim to reduce and/or eliminate the need for shims in manufacturing assemblies, such as in manufacturing of aircraft wings. Exemplary methods include predicting a set of predicted manufacturing dimensions within a range of predetermined allowances for a first part, manufacturing the first part, scanning the first part to determine a set of actual manufacturing dimensions for the first part, and at least beginning manufacturing a second part before the scanning the first part is completed. The second part may be manufactured based on the set of predicted manufacturing dimensions for the first part. Once the scan of the first part is completed, the set of predicted manufacturing dimensions may be compared to a set of actual manufacturing dimensions to check for any non-compliant deviances between the predicted and actual manufacturing dimensions. Repairs and local re-scans may be performed in the areas of the non-compliant deviances, which may streamline manufacturing.

22 Claims, 3 Drawing Sheets

(58) Field of Classification Search
CPC .............. G05B 13/041; G05B 13/048; G05B 2219/37205; G05B 2219/37355; G05B 2219/45071; G05B 23/024; G05B 2219/14063; G05B 2219/31407; G05B 2219/32182; G05B 2219/32188; G05B 2219/32189; G05B 2219/32191; G05B 2219/32195; G05B 2219/32197; G05B 2219/32198; G05B 2219/32212
See application file for complete search history.

(56) References Cited

U.S. PATENT DOCUMENTS

| | | | |
|---|---|---|---|
| 4,512,837 A | 4/1985 | Sarh et al. | |
| 4,719,586 A * | 1/1988 | Moyer | G05B 19/4166 700/108 |
| 4,759,074 A * | 7/1988 | Iadipaolo | G01N 21/88 382/152 |
| 4,848,137 A | 7/1989 | Turner et al. | |
| 4,956,764 A * | 9/1990 | Carver | G05B 19/4097 33/547 |
| 5,005,277 A * | 4/1991 | Uemura | B62D 65/02 29/407.04 |
| 5,106,290 A | 4/1992 | Carver et al. | |
| 5,168,453 A * | 12/1992 | Nomaru | G05B 19/4083 29/407.05 |
| 5,208,763 A * | 5/1993 | Hong | G05B 19/402 700/192 |
| 5,380,978 A * | 1/1995 | Pryor | B23K 26/032 219/121.64 |
| 5,633,494 A | 5/1997 | Danisch | |
| 5,828,566 A | 10/1998 | Pryor | |
| 5,910,894 A * | 6/1999 | Pryor | G05B 19/41875 219/121.64 |
| 5,988,862 A | 11/1999 | Kacyra et al. | |
| 6,031,612 A | 2/2000 | Shirley | |
| 6,088,663 A | 7/2000 | Wang | |
| 6,237,210 B1 | 5/2001 | Stoewer et al. | |
| 6,354,152 B1 | 3/2002 | Herlick | |
| 6,505,393 B2 | 1/2003 | Stoewer et al. | |
| 6,618,505 B2 | 9/2003 | Cork et al. | |
| 6,731,990 B1 * | 5/2004 | Carter | G05B 13/026 700/52 |
| 6,811,733 B2 | 10/2004 | Nelson et al. | |
| 6,829,516 B2 * | 12/2004 | Popp | A61F 13/15772 700/108 |
| 6,877,203 B2 | 4/2005 | Engstrom et al. | |
| 6,892,160 B2 | 5/2005 | Gooch et al. | |
| 6,901,673 B1 | 6/2005 | Cobb et al. | |
| 7,110,956 B1 * | 9/2006 | Drake, Jr. | G05B 19/41865 705/7.37 |
| 7,194,326 B2 | 3/2007 | Cobb et al. | |
| 7,239,991 B2 * | 7/2007 | Tuszynski | G05B 17/02 700/13 |
| 7,481,901 B2 | 2/2009 | Talwar et al. | |
| 7,487,901 B2 | 2/2009 | Talwar et al. | |
| 7,565,206 B2 | 7/2009 | Palti | |
| 7,587,258 B2 | 9/2009 | Marsh et al. | |
| 7,621,701 B2 | 11/2009 | Skiles et al. | |
| 7,660,642 B1 * | 2/2010 | Tuszynski | G05B 19/41875 700/97 |
| 7,730,789 B2 | 6/2010 | Odendahl | |
| 7,756,321 B2 | 7/2010 | Marsh et al. | |
| 7,783,376 B2 | 8/2010 | Marsh et al. | |
| 7,787,979 B2 * | 8/2010 | Marsh | G05B 19/401 700/119 |
| 7,974,722 B2 | 7/2011 | Boyl-Davis et al. | |
| 8,177,169 B2 * | 5/2012 | Lobo Barros | B64C 1/26 244/131 |
| 8,185,238 B2 | 5/2012 | Gonzalez Sainz et al. | |
| 8,272,118 B2 | 9/2012 | Alvez | |
| 8,327,543 B2 | 10/2012 | Lafon | |
| 8,452,441 B2 * | 5/2013 | Jang | G05B 19/41875 700/121 |
| 8,498,727 B1 * | 7/2013 | Tuszynski | G05B 19/41875 700/97 |
| 8,557,165 B2 | 10/2013 | Jones et al. | |
| 8,620,470 B2 | 12/2013 | Cobb et al. | |
| 8,634,950 B2 | 1/2014 | Simonetti et al. | |
| 8,740,151 B1 * | 6/2014 | Rosman | B64C 1/061 244/119 |
| 8,756,792 B2 | 6/2014 | Boyl-Davis et al. | |
| 8,857,765 B2 | 10/2014 | Thomas et al. | |
| 8,882,046 B2 | 11/2014 | Edsall et al. | |
| 9,733,626 B2 * | 8/2017 | Friman | G05B 23/0267 |
| 9,910,497 B2 | 3/2018 | Kramer et al. | |
| 9,937,623 B2 * | 4/2018 | Vasquez | B25J 9/0084 |
| 9,952,580 B2 * | 4/2018 | Bode | G05B 19/19 |
| 10,054,927 B2 * | 8/2018 | Saulsbury | G05B 19/41865 |
| 10,183,329 B2 * | 1/2019 | Gunther | G05B 19/41875 |
| 10,324,426 B2 * | 6/2019 | Nakashima | B23C 3/13 |
| 10,353,959 B2 * | 7/2019 | Morimoto | G06F 16/90348 |
| 10,387,532 B2 * | 8/2019 | Soga | G05B 19/41875 |
| 2002/0166220 A1 * | 11/2002 | Imundo | B23P 6/00 29/402.09 |
| 2003/0031383 A1 | 2/2003 | Gooch | |
| 2003/0090682 A1 | 5/2003 | Gooch et al. | |
| 2004/0030436 A1 * | 2/2004 | Popp | A61F 13/15772 700/111 |
| 2005/0015169 A1 * | 1/2005 | Littlejohn | G05B 19/4097 700/108 |
| 2005/0033464 A1 * | 2/2005 | Nguyen | G05B 19/41875 700/108 |
| 2005/0100263 A1 | 5/2005 | Shi et al. | |
| 2005/0192695 A1 * | 9/2005 | Yoshida | G06Q 10/00 700/108 |
| 2005/0288812 A1 * | 12/2005 | Cheng | G05B 19/41875 700/109 |
| 2006/0052977 A1 * | 3/2006 | Wilson | G06T 7/0006 702/155 |
| 2006/0106572 A1 * | 5/2006 | Eichblatt | G05B 23/0294 702/181 |
| 2006/0218107 A1 * | 9/2006 | Young | G05B 13/027 706/13 |
| 2007/0039155 A1 * | 2/2007 | Savoy | B62D 65/06 29/407.1 |
| 2007/0244644 A1 * | 10/2007 | Tanahashi | G01W 1/10 702/3 |
| 2008/0183412 A1 * | 7/2008 | Funk | G01B 11/0616 702/97 |
| 2008/0205763 A1 * | 8/2008 | Marsh | B64F 5/10 382/190 |
| 2008/0223985 A1 * | 9/2008 | Marsh | G05B 19/401 244/119 |
| 2008/0281557 A1 * | 11/2008 | Emigholz | G05B 13/048 702/179 |
| 2009/0138223 A1 * | 5/2009 | Kim | B22D 11/16 702/81 |
| 2010/0010655 A1 * | 1/2010 | Corcoran | G06F 30/00 700/98 |
| 2010/0082143 A1 * | 4/2010 | Pantaleano | G06Q 10/06 700/105 |
| 2010/0304039 A1 | 12/2010 | Bausen et al. | |
| 2011/0078885 A1 * | 4/2011 | DeRoche | B23P 17/00 29/407.05 |
| 2011/0178622 A1 * | 7/2011 | Tuszynski | G05B 15/02 700/103 |
| 2011/0276169 A1 * | 11/2011 | Bourg, Jr. | G05B 19/41865 700/109 |
| 2011/0282480 A1 * | 11/2011 | Jang | G05B 23/0243 700/110 |
| 2012/0016643 A1 * | 1/2012 | Jang | G05B 19/41875 703/2 |
| 2012/0136470 A1 * | 5/2012 | Deans | G05B 19/41875 700/110 |
| 2012/0202664 A1 * | 8/2012 | Brown | A61F 13/15772 493/8 |
| 2012/0204671 A1 * | 8/2012 | Tesar | B25J 9/08 74/490.05 |
| 2013/0041596 A1 * | 2/2013 | DeRoche | B23P 17/00 702/35 |

(56) References Cited

U.S. PATENT DOCUMENTS

| | | | | |
|---|---|---|---|---|
| 2013/0268238 | A1* | 10/2013 | McCready | G05B 23/024 702/179 |
| 2013/0326851 | A1* | 12/2013 | Woodhull | G05B 19/41805 29/407.01 |
| 2014/0052425 | A1* | 2/2014 | Selvaraj | G05B 23/0254 703/6 |
| 2014/0236334 | A1 | 8/2014 | Glasscock et al. | |
| 2014/0294498 | A1* | 10/2014 | Logan | A47B 47/042 403/376 |
| 2014/0303764 | A1* | 10/2014 | Boyl-Davis | B64C 1/26 700/98 |
| 2014/0353305 | A1* | 12/2014 | Matsen | B64C 3/26 219/634 |
| 2014/0365061 | A1* | 12/2014 | Vasquez | G05D 1/021 701/23 |
| 2015/0024233 | A1* | 1/2015 | Gunther | G05B 19/41875 428/601 |
| 2016/0091888 | A1* | 3/2016 | Doyle | G05B 19/4097 700/97 |
| 2016/0158940 | A1* | 6/2016 | Brockway | B25J 9/1687 700/114 |
| 2016/0185056 | A1* | 6/2016 | Beacham | B29D 11/0099 264/2.7 |
| 2016/0207638 | A1* | 7/2016 | Valenzuela | G05D 1/0011 |
| 2016/0221692 | A1* | 8/2016 | Pirro | B25B 11/02 |
| 2016/0325851 | A1* | 11/2016 | Turner | B64F 5/10 |
| 2016/0334778 | A1* | 11/2016 | Cope | G05B 19/401 |
| 2017/0094812 | A1* | 3/2017 | Leggett | G06F 1/1616 |
| 2017/0132355 | A1* | 5/2017 | Vasquez | G06F 30/15 |
| 2017/0138385 | A1* | 5/2017 | Clark | G06F 30/23 |
| 2017/0206469 | A1* | 7/2017 | Das | G06N 5/022 |
| 2017/0210489 | A1 | 7/2017 | Bode et al. | |
| 2017/0316339 | A1* | 11/2017 | Li | G06N 5/022 |
| 2017/0329874 | A1* | 11/2017 | Morimoto | G06F 7/16 |
| 2018/0050824 | A1* | 2/2018 | Regnault | G05B 19/41805 |
| 2018/0067476 | A1 | 3/2018 | Engelbart et al. | |
| 2018/0082002 | A1* | 3/2018 | Demena | G06F 30/20 |
| 2018/0107194 | A1* | 4/2018 | Erion | G05B 19/4099 |
| 2018/0113425 | A1* | 4/2018 | Nakashima | B23C 3/13 |
| 2018/0150038 | A1* | 5/2018 | Lin | G05B 19/41875 |
| 2018/0284739 | A1* | 10/2018 | Ueda | G05B 19/418 |
| 2018/0307481 | A1* | 10/2018 | Ganesan | G06F 8/71 |
| 2019/0072932 | A1* | 3/2019 | Sitnikov | G05B 19/4099 |
| 2019/0152621 | A1* | 5/2019 | Esteban Finck | B64F 5/10 |
| 2019/0265021 | A1* | 8/2019 | Valenzuela | G01B 11/005 |
| 2019/0278261 | A1* | 9/2019 | Shibuya | G05B 23/0243 |
| 2019/0382135 | A1* | 12/2019 | Gonzalez | B23P 19/12 |

FOREIGN PATENT DOCUMENTS

| | | |
|---|---|---|
| EP | 0 957 336 | 11/1999 |
| EP | 0 976 472 | 2/2000 |
| EP | 0 888 202 | 10/2005 |
| EP | 1 719 030 | 10/2008 |
| EP | 2 368 799 | 9/2011 |
| EP | 2 939 786 | 11/2015 |
| EP | 3244329 | 11/2017 |
| WO | WO 00/45231 | 4/2000 |
| WO | WO 2013/117971 | 8/2013 |

OTHER PUBLICATIONS

Richey, M., McIvor, R., and Sandwith, S., "Computer Aided Design Manufacturing & Measurement Integration (Presentation)," *Coordinate Measurement System Committee*, Aug. 13-17, 2001.

Richey, M., McIvor, R., and Sandwith, S., "Computer Aided Design Manufacturing & Measurement Integration (Paper)" *Coordinate Measurement System Committee*, Aug. 13-17, 2001.

Calkins, J.M., "Quantifying Coordinate Uncertainty Fields in Coupled Spatial Measurement Systems," *Doctoral dissertation submitted to Virginia Polytechnic Institute and State University*, Jul. 30, 2002.

Olexa, R., "Measuring the Big Stuff," *Manufacturing Engineering*, vol. 130, No. 4, Apr. 2003.

Flynn, R. And Horky, S., "Automated Metrology in a Business Jet Final Assembly Line," *The Journal of the CMSC*, vol. 10, No. 1, Spring 2015.

European Patent Office, Extended European Search Report for related European Application No. 19201538, dated Mar. 17, 2020.

\* cited by examiner

METHODS OF SYNCHRONIZING MANUFACTURING OF A SHIMLESS ASSEMBLY

FIELD

The present disclosure relates generally to methods of synchronizing manufacturing of a shimless assembly.

BACKGROUND

In manufacturing processes, multiple structural components are often manufactured separately and then assembled together. For example, tens, or even hundreds (or more) of structural components may be assembled together to form structures in aerospace or aviation applications, such as in the manufacture of aircraft wings. Gaps between such structural components may result from manufacturing tolerances (expected, but unplanned variations) of the components, and/or from unique challenges associated with certain materials. For example, in making composite parts, geometric variations in final parts may result from variations in fiber diameter and/or variations in resin volume, which may accumulate via a plurality of layers of material that are laid up to form the composite part.

Figure 1:
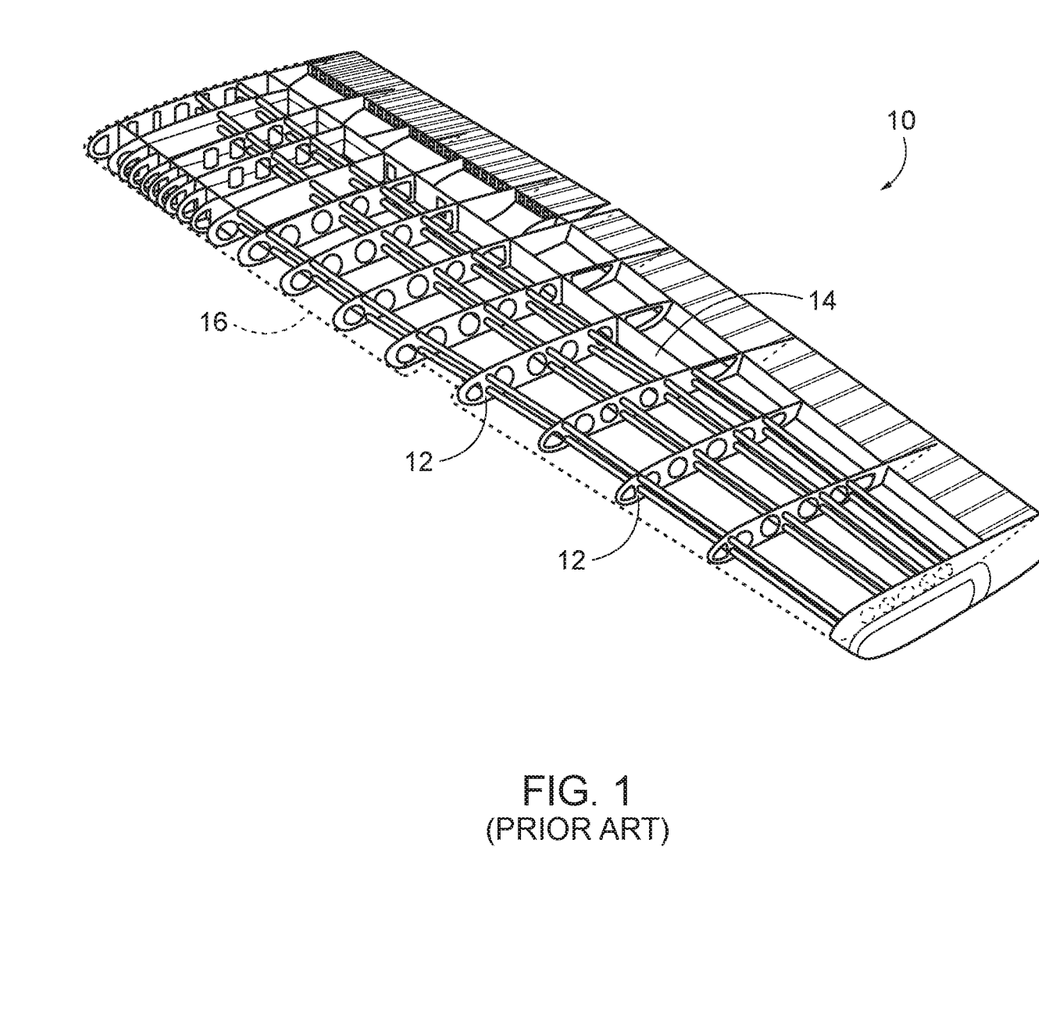
FIG. 1 is a perspective view of a prior art example of a structure for an aircraft wing.

An example where such issues arise is in the assembly of a skin panel to rib feet to form a wing-box of an aircraft. FIG. 1 shows an example of a wing box structure for an aircraft wing 10. Generally, aircraft wing 10 includes a ladder-like structure formed by a plurality of ribs 12 spaced apart between one or more longer spars 14. Ribs 12 generally define the overall shape of aircraft wing 10, with a skin panel 16 (partially shown in dashed line, also referred to as a wing skin) being attached to ribs 12, conforming to the shape of the ribs 12. In a conventional process, skin panel 16 is manufactured in a desired shape and is then brought into position to engage ribs 12 and spars 14. The underlying rib/spar ladder structure may have, for example, outwardly projecting rib feet on which respective parts of the inner surface of the skin panel 16 are intended to rest so that fasteners can be inserted through the skin panel 16 and the rib feet to secure the skin panel to the ladder structure. Engineering tolerances for the skin panel 16 are generally greater than is the acceptable error in fit between the skin panel 16 and the ladder structure, which can result in interface gaps between the skin panel 16 and the ladder structure in certain areas. For example, when the skin panel is brought in an unstressed state into position against the rib feet, it is commonly found that, whilst some rib feet are in contact with the skin panel, others are spaced from it. The skin panel can only be deformed a slight amount to safely accommodate these gaps without creating stresses stored within the skin panel or affecting the shape and aerodynamics of the skin panel. However, enforcing extreme tolerances increases costs and/or may simply be infeasible. Thus, manufactures typically rely on filling the gaps by applying a liquid or solid shim between ribs 12 and skin panel 16, where needed (e.g., in the positions of the gaps).

To create the needed shims, the skin panel and the underlying structure of the wing-box are generally brought into position next to each other so that gaps between the rib feet and the inner surface of the skin panel can be measured. Shims are then made to fill the gaps, the shape and size of each shim being chosen according to the shape and size of the respective gap to be filled. In this approach, the final assembly of the skin panel and the underlying structure of the wing-box is deferred until after the shims have been manufactured, at which point the skin panel and the underlying structure are brought into position next to each other again. Such added steps and delays increase manufacturing costs and decrease efficiency. Additionally, placement of these shims is a generally time-consuming and expensive process. In some cases, composite structures may have to be assembled and disassembled several times to measure the shim gaps and drill and clean holes. Care also has to be taken to ensure that a shim that has been manufactured to a particular size and shape to fill a particular gap is used to fill the correct gap, and not inadvertently used to fill a different gap.

In some manufacturing processes, even further delays are introduced at other stages. For example, efforts have been made to reduce the use of shims, such as by fabricating the skin panel and then custom-manufacturing the spars and spar caps, once the as-built dimensions of the skin panel are known. This method can create an inventory build-up of wing skin panels while the spars and spar caps are being made. The wing skin panels are large structures that must be held and supported properly while the spars and spar caps are made, to prevent damage to the skin panel, which takes up valuable warehouse space for long periods of time. And even such attempts may still require the use of shims in some places.

SUMMARY

Presently disclosed methods aim to reduce and/or eliminate the need for shims in manufacturing assemblies, such as in manufacturing of aircraft wings. Exemplary methods of manufacturing an assembly of at least a first part and a second part generally include predicting a set of predicted manufacturing dimensions within a range of predetermined allowances for the first part, manufacturing the first part, scanning the first part to determine a set of actual manufacturing dimensions for the first part, and at least beginning manufacturing the second part before the scanning the first part is completed. The predicted manufacturing dimensions may be predicted using a historical dataset from a plurality of previously-built parts, with the dataset including dimensions of the previous parts, along with data from a plurality of factors. The second part may be manufactured based on the set of predicted manufacturing dimensions for the first part, such that the second part is configured to engage the as-predicted first part. However, such methods may save valuable manufacturing time by enabling the second part to be at least partially, or fully, completed before the first part has been fully scanned (and therefore before the actual as-built dimensions of the respective first part are known). Once the scan of the first part is completed (and the as-built dimensions of the first part are determined), the set of predicted manufacturing dimensions may be compared to a set of actual manufacturing dimensions to check for any non-compliant deviances between the set of predicted manufacturing dimensions and the set of actual manufacturing dimensions. Such methods may enable automated manufacturing of the second part (e.g., do not require customization of the second part at the initial manufacturing stage), and may thus streamline the assembly process as a whole, with the second part being modified (e.g., customized) just in the areas of any detected non-compliant deviances between the as-built first and second parts.

Part scan models are also disclosed, which may be configured to create a model of an interface zone between a first mating structure and a second mating structure. Such models may include an original large scan base layer of the entire interface zone at the time of initial manufacture, and one or more small scan layers stitched into the large scan base layer, with the small scan layers corresponding to localized portions of the interface zone that were modified after the time of initial manufacture.

DESCRIPTION

Figure 2:
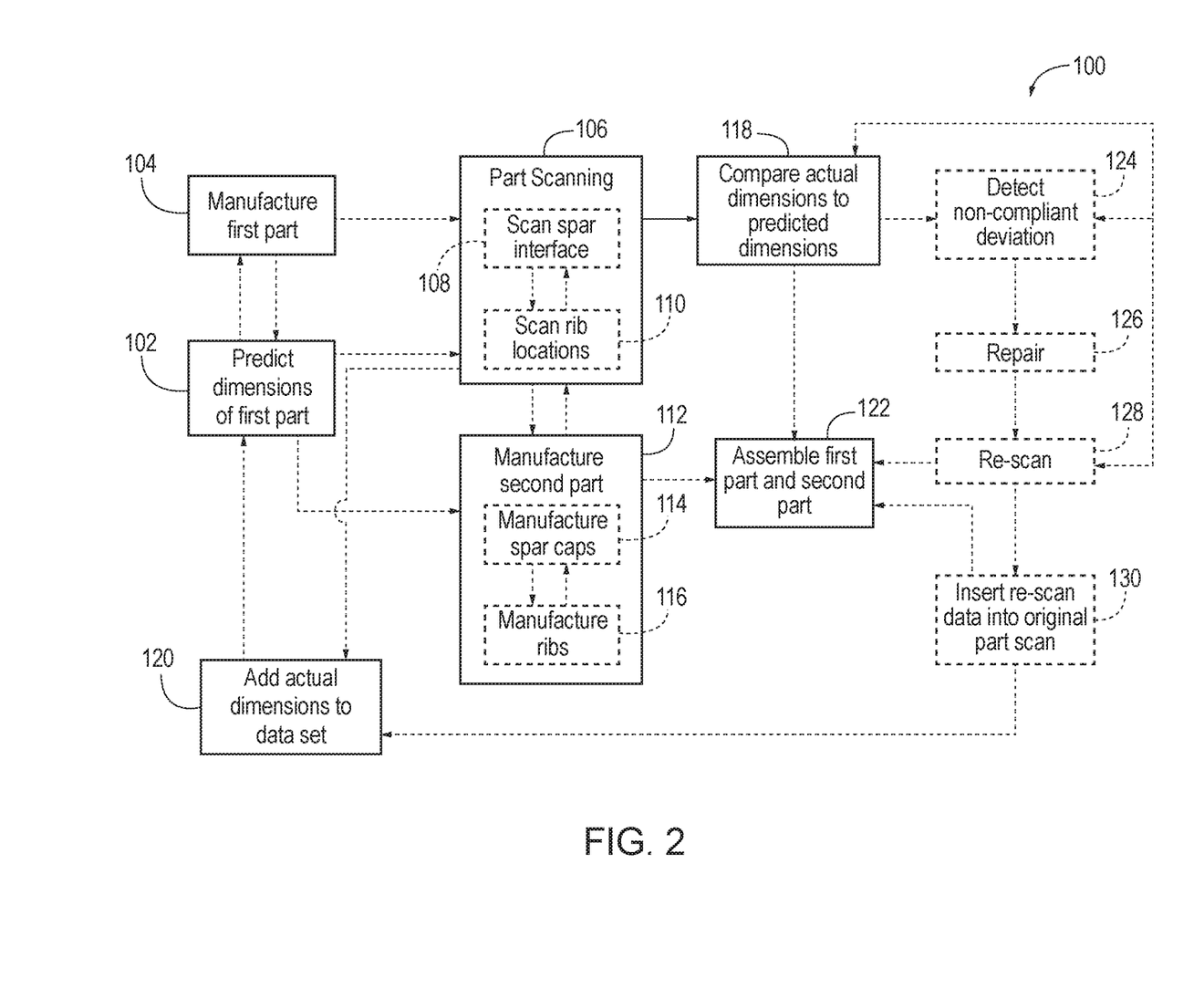
FIG. 2 is a schematic flowchart diagram illustrating representative methods of manufacturing an assembly according to the present disclosure.

FIG. 2 schematically provides a flowchart that represents illustrative, non-exclusive examples of methods 100 according to the present disclosure. In FIG. 2, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 2 are not limiting, and other methods and steps are within the scope of the present disclosure, including methods having greater than or fewer than the number of steps illustrated, as understood from the discussions herein.

Figure 3:
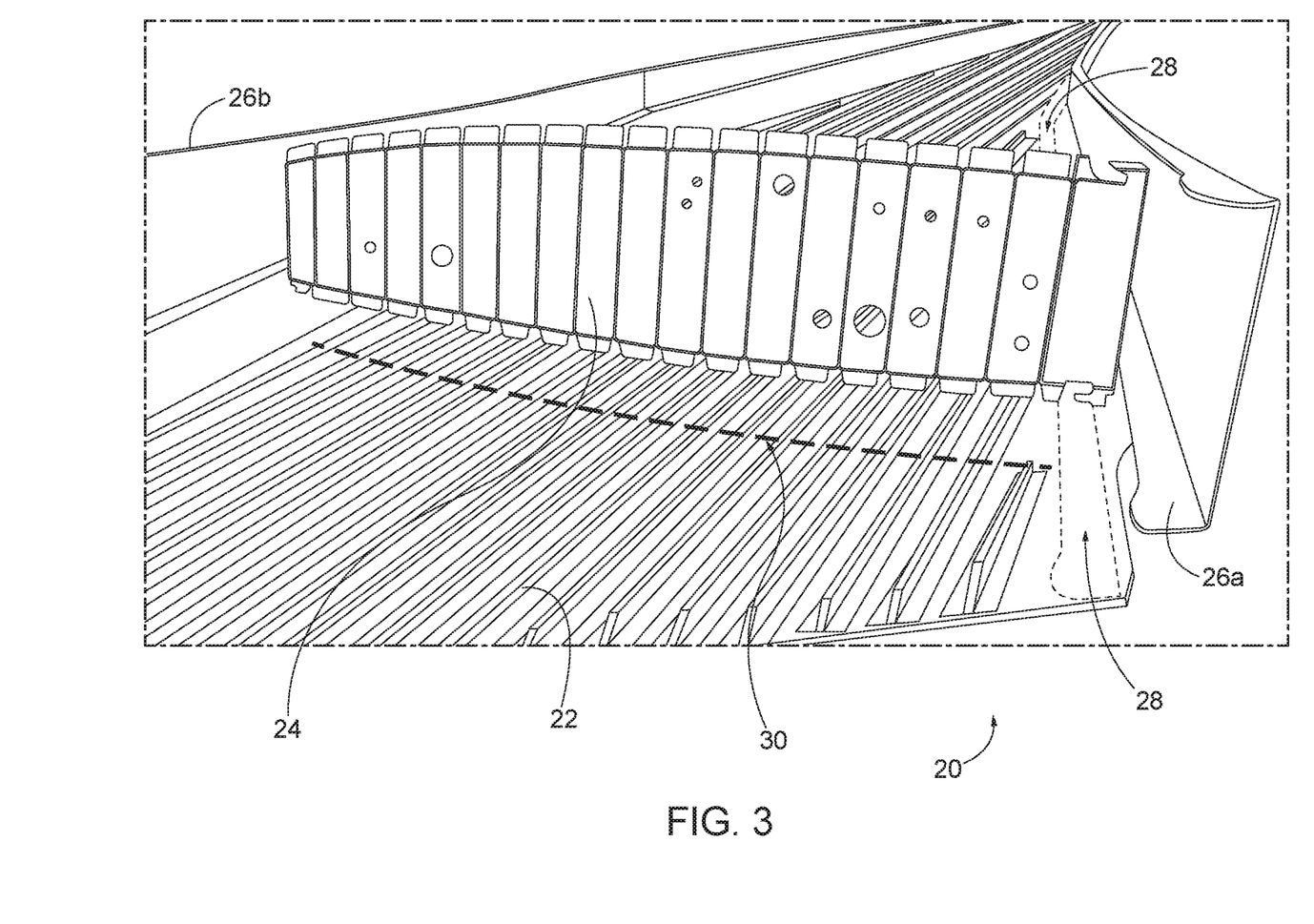
FIG. 3 is an example of a portion of an assembly that may be manufactured according to methods of the present disclosure, shown partially exploded.

Methods 100 described herein generally apply to manufacturing an assembly of two or more parts, such as assembling a first part and a second part. Of course, such methods are generally applicable to manufacturing an assembly of a plurality of parts, but will initially be described in terms of assembling a first part (e.g., a wing skin panel for an aircraft wing) and a second part (e.g., a rib for the aircraft wing), for clarity. FIG. 3 illustrates a partially exploded, partial aircraft wing assembly 20, for reference in discussing methods 100 of FIG. 2. Wing assembly 20 includes a skin panel 22 (which may also be referred to as a wing panel skin, a wing skin panel, a panel skin, a wing skin, or a wing panel), a first rib 24, and first and second spar caps 26a, 26b. Wing assembly 20 would, when completed, include a plurality of ribs spaced along the length of skin panel 22, in addition to one or more other skin panels to complete the structure, as will be appreciated by those of skill in the art. Spar caps 26a, 26b are generally secured to skin panel 22 along longitudinal interface zones 28 extending longitudinally along skin panel 22, whereas first rib 24 is secured to skin panel 22 along a transverse interface zone 30 extending transversely across skin panel 22, as shown in FIG. 3. Any additional ribs secured to skin panel 22 may be secured to additional respective transverse interface zones spaced apart from transverse interface zone 30. In examples involving assembling different structures other than the illustrative aircraft wing, the first and second parts will generally have different interface zones, in terms of number, placement, spacing, shape, size, and/or orientation, though these variations do not depart from the scope of the present disclosure.

Disclosed methods 100 include predicting a set of predicted manufacturing dimensions for a first part at 102, such as a set of predicted manufacturing dimensions for skin panel 22. While manufactured parts have a designed, or intended, set of dimensions, it is understood that the actual built parts may vary slightly form the designed dimensions. For example, while a manufacturing process may intend to produce a plurality of fasteners each 1.00 centimeter (cm) long, the actual fasteners produced may vary between, for example, 0.95 and 1.05 cm in length. With parts having complex contours and shapes, such variances also increase in complexity. Accordingly, said set of predicted manufacturing dimensions may be predicted ranges of manufacturing dimensions. In other words, a range of predetermined and/or acceptable allowances (i.e., a range of acceptable specifications, variations, and/or dimensions) may be predicted at 102, based on a historical data set from a plurality of previously built parts. For example, in the instance of skin panel 22, the predicted manufacturing dimensions may be predicted at 102 based on a historical dataset from a plurality of previously built skin panels (as opposed to simply looking at the designed dimensions of the skin panel). Predicting the predicted manufacturing dimensions at 102 generally includes characterizing an interface where the parts are to be engaged with one another.

Predicting the predicted manufacturing dimensions at 102 is typically based on a plurality of independent factors, rather than simply being an average of historical dimensions of built parts. For example, predictions may be based on the supplier of the materials used in manufacturing the part, the particular batch of material used, atmospheric and/or local environmental conditions where the part is manufactured, the type of bagging material or other tooling material used during lay-up, the type of pre-impregnated materials used, the end effector used during manufacture (or the settings of the same), the feed rate of a tape-laying head for laying fiber tape, and/or the temperature and/or pressure used in the autoclave when manufacturing the part. Such data associated with manufacturing parts is often recorded, and currently disclosed methods may utilize any information available in order to predict dimensions of future parts. Determining the predicted manufacturing dimensions at 102 may include statistical process control, and/or may leverage analytics and/or machine learning in some methods 100. Such predictive models may take a number of inputs (e.g., any or all of the factors listed above) in order to predict dimensions for a manufactured part. For example, the predictive model may predict different dimensions for a part manufactured using a first supplier's material than it does for the same part manufactured using a second supplier's material. Advantageously, currently disclosed methods 100 may allow for cheaper manufacturing of the first part. For example, in some methods 100, predicting the predicted dimensions at 102 may result in accurate enough predictions even when using a less precise (and cheaper) manufacturing technique for the first part.

Determining the predicted dimensions at 102 may be performed prior to, concurrently with, and/or after manufacturing the first part (e.g., skin panel 22) at 104. Manufacturing the first part at 104 may include steps such as trimming one or more layers of the first part, drilling one or more holes through one or more layers of the first part, and/or laying up a plurality of fiber-reinforced polymer layers. The first part may be scanned at 106 to measure and determine a set of actual manufacturing dimensions of the first part, as built. Generally, scanning the first part at 106 includes performing a global scan of the entire part, though in some examples, only portions of the first part may be scanned at 106. Scanning the first part at 106 may be performed via, for example, laser scanning, optical scanning, photography, metrology scanning, and/or any other suitable technique. In some examples, scanning the first part at 106 may include taking a plurality of photos or images of the first part (e.g., using a large camera platform, and/or suspending and/or moving a camera with respect to the first part) with reference markers positioned on the first part, such that the images may be stitched together to form a composite scan of the first part, using the reference markers as reference points for combining the images. Scanning the first part at 106 generally includes, as a minimum, scanning any interface zones where the second part is to be engaged with the first part. For example, in the case of skin panel 22, scanning the first part at 106 may include scanning one or more longitudinal interface zones 28 (e.g., scanning spar interfaces) at 108, and/or scanning one or more transverse interface zones 30 (e.g., scanning rib locations) at 110. Scanning the first part at 106 may also be performed for quality control, records, learning, and/or future analytics purposes.

Methods 100 also include manufacturing one or more second parts (and/or one or more additional parts) for the assembly, at 112, which may be at least initiated before scanning the first part at 106 is completed. For example, manufacturing the second part at 112 may be at least partially performed, or fully completed, during scanning of the first part at 106 (e.g., before the scanning of the first part is completed). While non-intuitive, this sequencing can improve manufacturing times and efficiency. In the example at hand, manufacturing the second part at 112 may include manufacturing one or more spars and/or spar caps at 114 (e.g., spar caps 26a, 26b) and/or manufacturing one or more ribs at 116 (e.g., first rib 24). The second part (or parts) may be manufactured at 112 such that the second part is configured to engage the first part, based on the predicted manufacturing dimensions for the first part. In other words, the second part may be manufactured at 112 before the complete as-built dimensions of the first part are known. This may allow manufacturing of the second part to be automated, as opposed to waiting to determine the as-built dimensions of the first part before commencing a custom-manufacture of the second part.

When scanning the first part at 106 is complete, the actual manufacturing dimensions of the as-built first part (as determined by scanning the first part at 106) are compared to the predicted manufacturing dimensions of the first part, at 118. By such comparison, any non-compliant deviances between the actual and predicted manufacturing dimensions can be detected. The criteria for non-compliant deviances may be predetermined, based on desired tolerances and allowances. For example, a non-compliant deviance may be determined in an area where a respective actual as-built dimension is larger than the maximum dimension in the range of predicted dimensions, or smaller than the minimum dimension in the range of predicted dimensions. Additionally, the actual manufacturing dimensions of the first part may be added to the historical dataset at 120, to be used in predicting dimensions of subsequently made first parts (e.g., for future data analytic analysis of future parts).

The first part and the second part (along with any additional parts) are joined together, or assembled at 122, to form the assembly. For example, skin panel 22, first rib 24, and spar caps 26a, 26b (FIG. 3) are assembled, along with additional parts, to form aircraft wing assembly 20. In some methods 100, the parts may be mated with each other (e.g., brought together to engage one another at the interface zones) without requiring metrology or scanning of the second part (e.g., the ladder structure of ribs and spars) prior to engaging the second part with the first part (e.g., the skin panel).

In methods 100 including a third part (and/or additional second parts, and/or additional other parts), the third part may be manufactured to engage the first part, also based on the set of predicted manufacturing dimensions for the first part. For example, a second part (e.g., first rib 24) and a third part (e.g., first spar cap 26a) may each be manufactured according to the predicted dimensions of skin panel 22, before skin panel 22 has been fully scanned. In some methods 100, manufacturing of the parts for the assembly may be said to be decoupled, as compared to conventional techniques. For example, spar caps 26a, 26b may be initially manufactured to the same dataset each time, without relying on the as-built dimensions of the ribs and skin panel at the time the spar caps are manufactured.

In some methods 100, comparing the set of predicted dimensions to the set of actual dimensions at 118 results in detecting one or more non-compliant deviances at 124. In such methods 100, a repair may be performed at 126 to accommodate, or remove the non-compliant deviances detected at 124. For example, the first part, second part, and/or third part may be modified such that the actual dimension is within the set of predicted ranges of dimensions, such that the parts may be engaged and assembled together without requiring shims to be positioned between the parts (e.g., such that the fit between the first part and the second part is within predetermined tolerances). In the example of the aircraft wing assembly, a non-compliant deviance may be detected where the as-built dimensions of the parts would result in an unacceptable interface gap between skin panel 22 and first rib 24, and/or between skin panel 22 and spar cap 26a and/or 26b, that would otherwise require placement of a shim at the non-compliant interface. However, in the presently disclosed methods, rather than creating a shim for such a non-compliant deviance, the parts may be locally repaired to prevent the need for a shim. For example, skin panel 22 may be trimmed, "shaved," and/or machined down (e.g., removing material), material may be removed from first rib 24, and/or material may be removed from spar cap 26a and/or 26b, such that the parts can be assembled and engage with one another within predetermined tolerances. In some cases, repairing the parts at 126 may include adding material to the first part, the second part, and/or any additional parts, though as used herein, the phrase "adding material" does not encompass inserting a shim into the assembly. For example, sacrificial material may be added to the parts in areas of non-compliant deviances, and then machined down.

Repairing the parts at 126 may include determining how much material to add to or remove from one or more contact surfaces. For example, repairing the parts at 126 may include adding or removing material from skin panel 22 at one or more various locations along a given transverse interface zone 30, and/or at one or more various locations along a given longitudinal interface zone 28. Additionally or alternatively, repairing the parts at 126 may include adding material to or removing material from a contact surface of first rib 24 that is configured to engage transverse interface zone 30, and/or adding material to or removing material from a contact surface of spar cap 26a and/or 26b that is configured to engage longitudinal interface zone 28. In other words, repairing the parts at 126 may include modifying one or more respective local areas of the first part, one or more respective local areas of the second part, and/or one or more respective local areas of the third part, wherein the local areas modified correspond to areas that engage with one or more other parts in the regions of the detected non-compliant deviances. Because the second and third parts have been manufactured according to predicted dimensions (as opposed to according to designed, or intended dimensions) in methods 100, machining the parts for the repairs at 126 is generally faster and more efficient than creating shims in conventional methods.

After repairing the parts at 126, one or more local areas may be re-scanned at 128, in the areas of the non-compliant deviances detected at 124 (e.g., in the local areas of where the modifications and/or repairs were made at 126). Re-scanning at 128 may include re-scanning the first part at interface locations corresponding to non-compliant deviations and/or re-scanning the assembly of parts in the areas of non-compliant deviations. Advantageously, local re-scans of the repaired portions at 128 may be performed without needing to place the part in a large gantry, which can create cost savings in some methods 100. As a result of local scanning at 128, if any non-compliant deviances are still detected at 124, additional repairs may be performed at 126, repeating until the final part is assembled to within tolerances. Data (e.g., dimensions) from the local scanning at 128 may be digitally inserted (which may be referred to herein as being digitally stitched) into the set of actual manufacturing dimensions at 130, such that the set of actual manufacturing dimensions is accurate for the final as-built part, and then added to the historical dataset at 120. For example, reference coordinates of the first part may be used during re-scanning at 128 and/or scanning at 106 to facilitate insertion of data from re-scanning at 128 into the large scan of the first part.

As such, methods 100 may include creating a part scan model as part of the historical data set, with the part scan model including a scan of an interface zone between a first mating structure and a second mating structure, such as the transverse and/or longitudinal interface zones between the skin panel and the ribs and/or spars of the aircraft wing assembly of FIG. 3. In one example, the first mating structure may be a spar interface of a skin panel (e.g., longitudinal interface zone 28) for an aircraft wing, and the second mating structure may be a spar cap configured to engage the skin panel (e.g., spar caps 26a, 26b). Additionally or alternatively, the first mating structure may be a rib location of a skin panel (e.g., transverse interface zone 30) for an aircraft wing, and the second mating structure may be a rib (e.g., first rib 24) configured to engage the skin panel. The part scan model may include an original large scan base layer of the entire interface zone (e.g., the entire longitudinal interface zone 28, and/or the entire transverse interface zone 30) at the time of initial manufacture, as well as one or more small scan layers stitched into the large scan base layer. The small scan layers correspond to localized portions of the interface zone or zones that were modified after the time of initial manufacture, such as via repairs or modifications performed at 126 in response to detected non-compliant deviations.

Such methods 100 according to the present disclosure may provide a number of advantages in manufacturing, especially in the manufacture of large assemblies, such as aircraft wings. By beginning to manufacture the second parts at 112 before scanning of the first part is complete at 106, inventory at the factory may be reduced, by reducing the amount of time a skin panel needs to be stored before being assembled with the other parts. Such reduction in storage needed, as well as the decreased manufacturing time from not having to form and shape and place a multitude of shims in the assembly can both contribute to cost savings for a given manufacturing process. Some methods 100 may also result in a reduction in the amount of rework needed and/or an increase in overall part quality in the finished part, as compared to prior art techniques involving placement of shims. Methods 100 also may result in increased manufacturing speed (e.g., throughput) and/or decreased manufacturing logistics complexity, again by aiming to eliminate the need for placement of shims in the assembly.

Illustrative, non-exclusive examples of inventive subject matter according to the present disclosure are described in the following enumerated paragraphs:

A1. A method of manufacturing an assembly comprising a first part and a second part, the method comprising:

predicting a set of predicted manufacturing dimensions within a range of predetermined allowances for the first part, using a historical dataset from a plurality of previously-built parts;

manufacturing the first part;

scanning the first part to determine a set of actual manufacturing dimensions for the first part;

manufacturing the second part, wherein the second part is manufactured based on the set of predicted manufacturing dimensions for the first part such that the second part is configured to engage the first part, wherein the manufacturing the second part is at least partially performed before the scanning the first part is completed; and comparing the set of predicted manufacturing dimensions to the set of actual manufacturing dimensions to check for any non-compliant deviances between the set of predicted manufacturing dimensions and the set of actual manufacturing dimensions.

A1.1. The method of paragraph A1, wherein the manufacturing the second part is completed before the scanning the first part is completed.

A1.2. The method of paragraph A1 or A1.1, wherein the scanning the first part comprises performing a global scan of the entire first part.

A1.3. The method of any of paragraphs A1-A1.2, further comprising adding the actual manufacturing dimensions to the historical dataset.

A2. The method of any of paragraphs A1-A1.3, further comprising joining the second part to the first part to form the assembly.

A3. The method of any of paragraphs A1-A2, wherein the first part comprises a skin panel for an aircraft wing.

A4. The method of any of paragraphs A1-A3, wherein the second part comprises a rib for an/the aircraft wing.

A5. The method of any of paragraphs A1-A4, wherein the second part comprises a spar cap for an/the aircraft wing.

A6. The method of any of paragraphs A1-A5, wherein the assembly comprises a third part, wherein the method further comprises:

manufacturing the third part, wherein the third part is manufactured such that it is configured to engage the first part, based on the set of predicted manufacturing dimensions for the first part, wherein the manufacturing the third part is at least partially performed before the scanning the first part is completed; and joining the third part to the first part, to form the assembly.

A6.1. The method of paragraph A6, wherein the manufacturing of the third part is completed before the scanning the first part is completed.

A7. The method of paragraph A6 or A6.1, wherein the first part comprises a/the skin panel for an/the aircraft wing, wherein the second part comprises a rib for the aircraft wing, and wherein the third part comprises a spar cap for the aircraft wing.

A8. The method of any of paragraphs A1-A7, further comprising:

detecting one or more non-compliant deviances between the set of predicted manufacturing dimensions and the set of actual manufacturing dimensions; and modifying the second part and/or a/the third part to accommodate the one or more non-compliant deviances, such that the second part and/or the third part engage the first part when assembled, within predetermined tolerances.

A9. The method of paragraph A8, wherein the modifying comprises one or more selected from the group comprising removing material from the second part, removing material from the third part, adding material to the second part, and adding material to the third part.

A9.1. The method of paragraph A8 or A9, wherein the modifying comprises determining how much material to remove from and/or add to one or more respective contact surfaces of the second part and/or one or more respective contact surfaces of the third part.

A10. The method of any of paragraphs A8-A9.1, wherein the modifying comprises modifying one or more respective local areas of the second part and/or one or more respective local areas of the third part, wherein the local areas correspond to areas that engage with the first part in the regions of the detected non-compliant deviances.

A11. The method of any of paragraphs A8-A10, further comprising locally scanning one or more local areas corresponding to the detected non-compliant deviances.

A12. The method of paragraph A11, wherein the locally scanning the one or more local areas is performed after the modifying the second part and/or the third part.

A13. The method of paragraph A11 or A12, further comprising digitally inserting data from the locally scanning the one or more local areas into the set of actual manufacturing dimensions.

A14. The method of any of paragraphs A1-A13, wherein the predicting is influenced by a plurality of independent factors.

A14.1. The method of paragraph A14, wherein the independent factors include the supplier of a material, the particular batch of material, atmospheric and/or local environmental conditions, a type of bagging material or other tooling material used during lay-up, a type of pre-impregnated materials used, an end effector used during manufacture (or the settings of the same), and/or a temperature and/or pressure used in an autoclave when manufacturing the first part.

A15. The method of any of paragraphs A1-A14.1, wherein the predicting comprises statistical process control.

A16. The method of any of paragraphs A1-A15, wherein the manufacturing the second part is automated, without custom-machining the second part to engage with a particular build of the first part.

A17. The method of any of paragraphs A1-A16, wherein the manufacturing the first part comprises:

laying up a plurality of fiber-reinforced polymer layers;
trimming the layers; and
drilling a plurality of holes in the layers.

A18. The method of any of paragraphs A1-A17, wherein the first part comprises a/the skin panel for an/the aircraft wing, wherein the skin panel comprises one or more spar interfaces for engaging one or more spars, wherein the skin panel comprises one or more rib locations for engaging one or more ribs, and wherein the scanning comprises scanning the spar interfaces and scanning the rib locations.

B1. A part scan model, comprising:

a scan of an interface zone between a first mating structure and a second mating structure, wherein the scan comprises:
an original large scan base layer of the entire interface zone at the time of initial manufacture; and
one or more small scan layers stitched into the large scan base layer, wherein the small scan layers correspond to localized portions of the interface zone that were modified after the time of initial manufacture.

B2. The part scan model of paragraph B1, wherein the first mating structure comprises a spar interface of a skin panel for an aircraft wing, and wherein the second mating structure comprises a spar configured to engage the skin panel.

B3. The part scan model of paragraph B1, wherein the first mating structure comprises a rib location of a skin panel for an aircraft wing, and wherein the second mating structure comprises a rib configured to engage the skin panel.

D1. Use of the method of any of paragraphs A1-A18 to join a plurality of parts together.

D2. Use of the method of any of paragraphs A1-A18 to manufacture an aircraft wing.

D3. Use of the method of any of paragraphs A1-A18 to join one or more ribs to a skin panel.

D4. Use of the method of any of paragraphs A1-A18 to join one or more spars and/or spar caps to a skin panel.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of manufacturing an assembly comprising a first part and a second part, the method comprising:
predicting a set of predicted manufacturing dimensions within a range of predetermined allowances for the first part using a historical dataset from a plurality of previously-built parts;
manufacturing the first part;
scanning the first part to determine a set of actual manufacturing dimensions for the first part;
manufacturing the second part, wherein the second part is manufactured based on the set of predicted manufacturing dimensions for the first part such that the second part is configured to engage the first part, wherein the manufacturing the second part is at least partially performed before the scanning the first part is completed;
comparing the set of predicted manufacturing dimensions to the set of actual manufacturing dimensions to check for any non-compliant deviances between the set of predicted manufacturing dimensions and the set of actual manufacturing dimensions;
detecting one or more non-compliant deviances between the set of predicted manufacturing dimensions and the set of actual manufacturing dimensions; and
modifying the second part to accommodate the one or more non-compliant deviances, such that the second part engages the first part when assembled, within predetermined tolerances.

2. The method according to claim 1, wherein the manufacturing the second part is completed before the scanning the first part is completed.

3. The method according to claim 1, wherein the scanning the first part comprises performing a global scan of an entirety of the first part.

4. The method according to claim 1, further comprising adding the set of actual manufacturing dimensions to the historical dataset.

5. The method according to claim 1, further comprising joining the second part to the first part, to form the assembly.

6. The method according to claim 5, wherein the first part comprises a skin panel for an aircraft wing and wherein the second part comprises a rib for the aircraft wing.

7. The method according to claim 6, wherein the assembly comprises a third part comprising a spar cap for the aircraft wing, wherein the method further comprises:
manufacturing the third part, wherein the third part is manufactured such that the third part is configured to engage the first part, based on the set of predicted manufacturing dimensions for the first part, wherein the manufacturing the third part is at least partially performed before the scanning the first part is completed; and
joining the third part to the first part, to form the assembly.

8. The method according to claim 1, wherein the modifying comprises one or more selected from the group comprising removing material from the second part and adding material to the second part.

9. The method according to claim 8, wherein the modifying comprises modifying one or more respective local areas of the second part that correspond to areas that engage with the first part in regions of the detected one or more non-compliant deviances.

10. The method according to claim 1, further comprising locally scanning one or more local areas corresponding to the detected one or more non-compliant deviances.

11. The method according to claim 10, wherein the locally scanning the one or more local areas is performed after the modifying the second part.

12. The method according to claim 11, further comprising digitally inserting data from the locally scanning the one or more local areas into the set of actual manufacturing dimensions.

13. The method according to claim 1, wherein the predicting is influenced by a plurality of independent factors.

14. The method according to claim 1, wherein the predicting comprises statistical process control.

15. The method according to claim 1, wherein the manufacturing the second part is automated, without custom-machining the second part to engage with a particular build of the first part.

16. A method of manufacturing an assembly comprising a first part, a second part, and a third part, the method comprising:
predicting a set of predicted manufacturing dimensions within a range of predetermined allowances for the first part using a historical dataset from a plurality of previously-built parts;

manufacturing the first part, wherein the first part comprises a skin panel for an aircraft wing;

scanning the first part to determine a set of actual manufacturing dimensions for the first part;

manufacturing the second part, wherein the second part comprises a rib for the aircraft wing, wherein the second part is manufactured based on the set of predicted manufacturing dimensions for the first part such that the second part is configured to engage the first part, and wherein the manufacturing the second part is at least partially performed before the scanning the first part is completed;

comparing the set of predicted manufacturing dimensions to the set of actual manufacturing dimensions to check for any non-compliant deviances between the set of predicted manufacturing dimensions and the set of actual manufacturing dimensions;

joining the second part to the first part;

manufacturing the third part, wherein the third part comprises a spar cap for the aircraft wing, wherein the third part is manufactured such that it is configured to engage the first part, based on the set of predicted manufacturing dimensions for the first part, wherein the manufacturing the third part is at least partially performed before the scanning the first part is completed; and joining the third part to the first part, to form the assembly.

17. The method according to claim 16, wherein the manufacturing the second part is completed before the scanning the first part is completed.

18. The method according to claim 16, wherein the scanning the first part comprises performing a global scan of an entirety of the first part.

19. The method according to claim 16, further comprising adding the actual manufacturing dimensions to the historical dataset.

20. The method according to claim 16, wherein the predicting is influenced by a plurality of independent factors.

21. The method according to claim 16, wherein the predicting comprises statistical process control.

22. The method according to claim 16, wherein the manufacturing the second part is automated, without custom-machining the second part to engage with a particular build of the first part.

* * * * *